Patented Apr. 28, 1931

1,803,157

UNITED STATES PATENT OFFICE

GEORG WESENBERG AND EDUARD BISCHKOPFF, OF ELBERFELD, NEAR COLOGNE-ON-THE-RHINE, GERMANY, ASSIGNORS TO WINTHROP CHEMICAL COMPANY, INC., OF NEW YORK, N. Y.

PLANT STIMULANT

No Drawing. Application filed February 4, 1927, Serial No. 166,007, and in Germany March 27, 1926.

It has been found that the salts of the thionic acids, for example, sodium thiosulfate, barium thiosulfate, magnesium thiosulfate, copper thiosulfate, ferro thiosulfate, mercury thiosulfate, sodium tetrathionate ($Na_2S_4O_6$), potassium hexathionate ($K_2S_6O_6$), sodium-ammonium-thiosulfate, copper-ammonium-thiosulfate, mercury-sodium-thiosulfate, are capable of exerting a surprisingly strong stimulating action upon the growth of potatoes, Jerusalem artichokes, and analogous farm or garden products. By their use the crop yields of these products may be considerably increased.

The following example illustrates the mode of application of the thionic acid salts in accordance with the invention.

100 kilograms of seed potatoes are dusted prior to planting with a mixture of 200 grams of sodium thiosulfate and 200 grams of kieselguhr. Seed potatoes so treated regularly give substantially better yields than untreated potatoes grown under otherwise identical conditions. The seed may be treated with a solution of the sodium thiosulfate with entirely similar results.

No explanation for the action of the thionic acid salts in promoting the growth of potatoes and similar vegetables can be given. It is possible that the action is, in part at least, that of a fungicide or insecticide or that the thionic acid salts serve as plant foods or that they merely stimulate plant growth, for instance, by facilitating the transfer of plant food from the soil to the growing plant.

It will be understood that it is within the scope of the invention to apply the thionic acid salts in any known or suitable way, i. e., to the plants themselves in form of dust or solution with or without known fertilizer materials, inert materials and the like.

We claim:—

1. Process for stimulating the growth of potatoes and similar garden and farm products which comprises applying thereto a thionic acid salt.

2. Process for stimulating the growth of potatoes and similar garden and farm products which comprises treating the seed of such products with a thionic acid salt.

3. Process for stimulating the growth of potatoes and similar garden and farm products which comprises treating the seed of such products with an alkali metal thiosulfate.

4. Process for stimulating the growth of potatoes and similar garden and farm products which comprises treating the seed of such products with sodium thiosulfate.

5. Process for stimulating the growth of potatoes and similar garden and farm products which comprises treating the seed of such products with a solution of sodium thiosulfate.

6. Process for stimulating the growth of potatoes and similar garden and farm products which comprises treating the seed of such products with sodium thiosulfate in dry finely divided form.

7. As a new product, a growth stimulant for potatoes and similar garden and farm products consisting essentially of a thionic acid salt.

8. As a new product, a growth stimulant for potatoes and similar garden and farm products consisting essentially of an alkali metal thiosulfate.

9. As a new product, a growth stimulant for potatoes and similar garden and farm products consisting essentially of sodium thiosulfate.

10. A dusting powder for stimulating the growth of potatoes and similar garden and farm products consisting essentially of a thionic acid salt and an inert material, both in finely divided form.

11. A dusting powder for stimulating the growth of potatoes and similar garden and farm products consisting essentially of sodium thiosulfate and an inert material, both in finely divided form.

In testimony whereof, we affix our signatures.

GEORG WESENBERG.
EDUARD BISCHKOPFF.